US008998599B2

(12) United States Patent
Martini et al.

(10) Patent No.: US 8,998,599 B2
(45) Date of Patent: Apr. 7, 2015

(54) APPARATUS AND METHOD FOR INJECTION MOLDING OPENING DEVICES ON SHEET PACKAGING MATERIAL FOR PACKAGING POURABLE FOOD PRODUCTS

(75) Inventors: Pietro Martini, Parma (IT); Davide Morciano, Modena (IT); Elisa Michelini, Modena (IT); Ivan Orlandi, Savignano sul Panaro (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 254 days.

(21) Appl. No.: 13/519,937

(22) PCT Filed: Feb. 23, 2011

(86) PCT No.: PCT/EP2011/052704
§ 371 (c)(1),
(2), (4) Date: Jun. 29, 2012

(87) PCT Pub. No.: WO2011/104287
PCT Pub. Date: Sep. 1, 2011

(65) Prior Publication Data
US 2012/0273996 A1 Nov. 1, 2012

(30) Foreign Application Priority Data
Feb. 23, 2010 (EP) .................................... 10154423

(51) Int. Cl.
*B29C 45/14* (2006.01)
*B65D 5/74* (2006.01)
*B29L 31/56* (2006.01)

(52) U.S. Cl.
CPC ....... *B29C 45/14344* (2013.01); *B29C 45/1418* (2013.01); *B65D 5/746* (2013.01);
(Continued)

(58) Field of Classification Search
CPC .................... B29C 45/1418; B29C 45/14344; B29C 2045/14983; B29L 2031/565
USPC .......................................... 425/127; 264/279
See application file for complete search history.

(56) References Cited

U.S. PATENT DOCUMENTS

2004/0239005 A1 12/2004 Ek et al.
2010/0166923 A1 7/2010 Martini et al.

FOREIGN PATENT DOCUMENTS

CN 1606493 A 4/2005
EP 1 352 840 A1 10/2003
(Continued)

OTHER PUBLICATIONS

Office Action (First Office Action) issued on Dec. 24, 2013, by the State Intellectual Property Office, P.R. China in corresponding Chinese Patent Application No. 201180010717.9, and an English Translation of the Office Action. (13 pages).
(Continued)

*Primary Examiner* — Alison Hindenlang
(74) *Attorney, Agent, or Firm* — Buchanan Ingersoll & Rooney PC

(57) ABSTRACT

An apparatus for injection molding an opening device on a sheet packaging material having a hole possessing an axis, formed through a first layer and sealed by a cover portion of a second layer; comprises a mold cavity coaxially housing the cover portion and comprising a first chamber adapted to be filled with molten plastic material on a first side of the cover portion, and a second tubular chamber projecting along the axis from the first chamber and adapted to be filled with the molten plastic material coming from the first chamber through an annular peripheral portion of the cover portion to form, on a second side of the cover portion, a spout; an annular rib delimiting a passage connecting the first and second chamber and defining, when filled with the plastic material, an annular tearable membrane connection portion between the spout and the plastic material covering the cover portion.

7 Claims, 4 Drawing Sheets

(52) U.S. Cl.
CPC ..... *B29L2031/565* (2013.01); *B29C 45/14811* (2013.01); *B29C 2045/14983* (2013.01); *B29K 2715/006* (2013.01); *B29K 2995/0067* (2013.01)

(56) References Cited

FOREIGN PATENT DOCUMENTS

| EP | 2008787 A1 | 12/2008 |
|---|---|---|
| JP | 7-300151 A | 11/1995 |
| JP | 8-91410 A | 4/1996 |
| JP | 2001-206425 A | 7/2001 |
| JP | 2001-354259 A | 12/2001 |
| JP | 2009-126552 A | 6/2009 |
| RU | 2010102786 A | 8/2011 |
| WO | 2009/000927 A1 | 12/2008 |

OTHER PUBLICATIONS

International Search Report (PCT/ISA/210) issued on Mar. 31, 2011, by the European Patent Office as the International Searching Authority for International Application No. PCT/EP2011/052704.

Written Opinion (PCT/ISA/237) issued on Mar. 31, 2011, by the European Patent Office as the International Searching Authority for International Application No. PCT/EP2011/052704.

A Decision of Granting issued on Jan. 21, 2015, by the Russian Patent Office (Federal Service for Intellectual Property) in corresponding Russian Patent Application No. 2012129546, with English translation of the Decision of Granting. (13 pages)

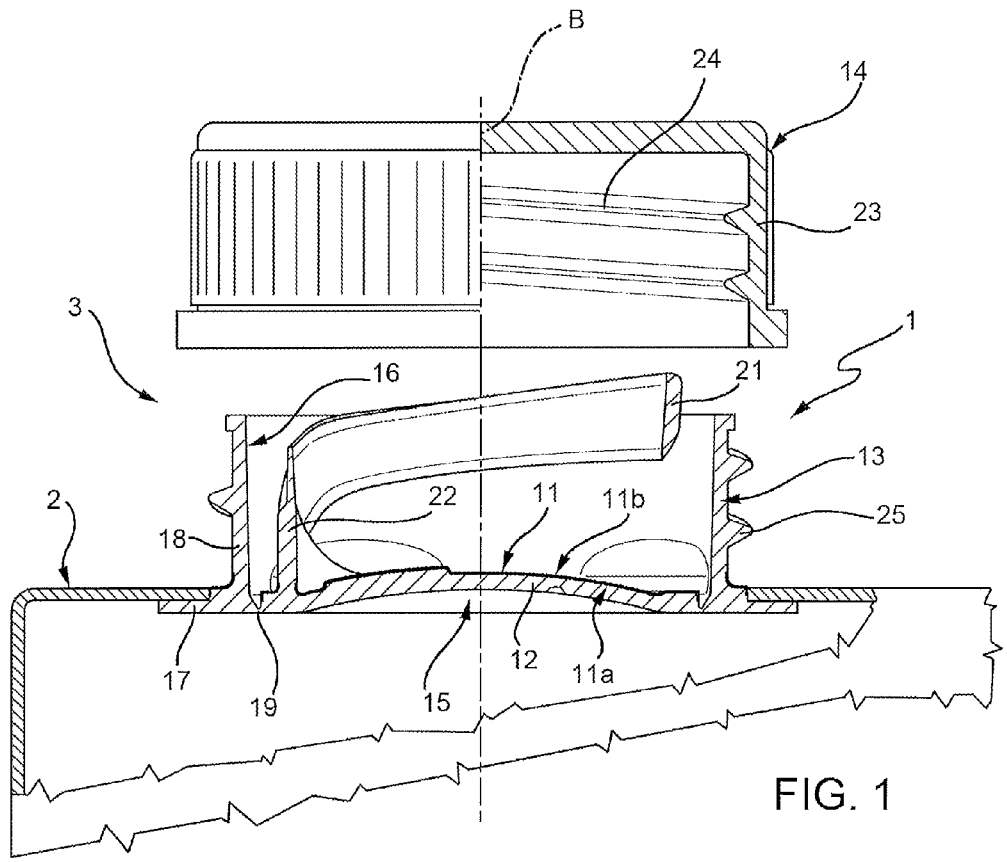
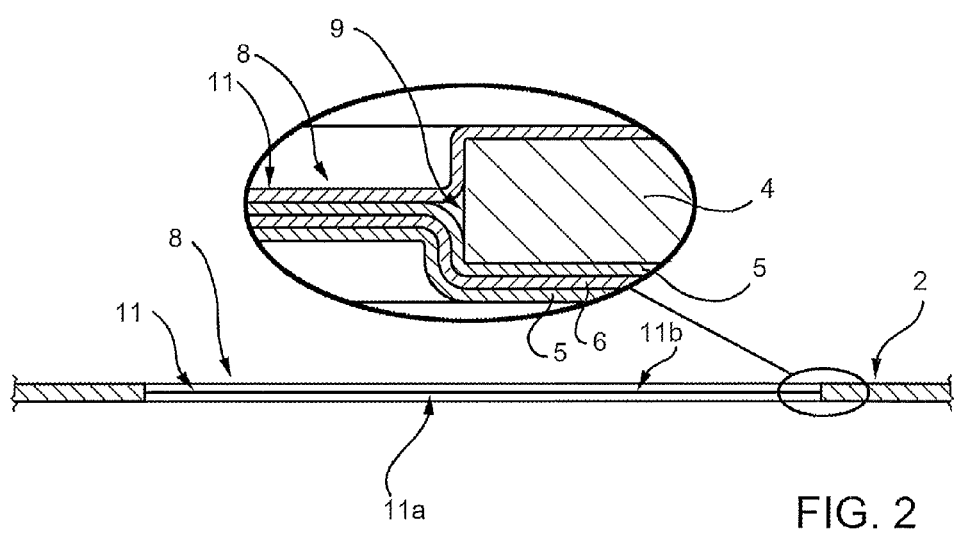
FIG. 1
FIG. 2

APPARATUS AND METHOD FOR INJECTION MOLDING OPENING DEVICES ON SHEET PACKAGING MATERIAL FOR PACKAGING POURABLE FOOD PRODUCTS

TECHNICAL FIELD

The present invention relates to an apparatus and a method for injection molding opening devices on sheet packaging material for packaging pourable food products.

BACKGROUND ART

As is known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material, and a number of lamination layers of heat-seal plastic material, e.g. polyethylene films, covering both sides of the base layer.

In the case of aseptic packages for long-storage products, such as UHT milk, the packaging material also comprises a layer of gas-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

Packages of this sort are normally produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; the web of packaging material so sterilized is then maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

To open the packages described above, various solutions have been proposed, including reclosable opening devices made of plastic material and substantially comprising a spout, e.g. tubular, defining a through opening and fitted to a hole in a wall of the package, and a removable, e.g. screw or hinged, cap fitted to and outwardly closing the spout.

When producing the opening device, the opening of the spout is sealed by a plastic confetti portion connected integrally to the spout and detachable from it along a smaller-section annular tearable membrane; on the side facing the cap, the confetti portion has an integral projecting pull ring, the free end of which is pulled by the user to detach the confetti portion from the spout along the tearable membrane and so open the product pour opening. More specifically, the pull ring extends inside, and at a predetermined distance from, the spout.

Using the opening devices described, the package is easy to open, with a reasonable amount of effort required of the user, and the confetti portion is detached neatly from the spout.

The same does not apply, however, in the case of packages requiring not only liquid but also gas sealing where the opening device is fitted to the packaging material.

In such cases, solutions are known in which the confetti portion of the opening device is fixed directly over a prelaminated hole in the packaging material, i.e. a hole formed in the base layer only and covered by the other lamination layers, including the layer of gas-barrier material.

Using this solution, opening the package calls not only for detaching the confetti portion from the spout, but also for tearing the layer of barrier material against the edge of the hole through the base layer. With commonly used barrier materials, such as aluminium, this invariably results in an increased effort by the user to unseal the package and in a jagged, frayed edge of the hole, thus impairing smooth pour-out of the food product.

In order to solve this problem, the Applicant devised a method and apparatus, disclosed in EP-A-2008787, for injection molding the opening device directly on the prelaminated hole of the packaging material.

In practice, the molten plastic material is injected onto one side of the prelaminated hole to cover it up to an annular peripheral portion thereof and to form, in this way, a plastic confetti portion directly attached to the prelaminated hole; the molten plastic material is then forced to pierce the prelaminated hole at such annular peripheral portion to form a pouring spout of the opening device projecting from an opposite side of the prelaminated hole and attached to the confetti portion through a smaller-section annular membrane connection portion adapted to be torn by the user to open the package.

In this way, the material forming the prelaminated hole is first pierced through and then resealed by the plastic material forming the spout. Therefore, the resulting package has the necessary gas-sealing properties, while at the same time is easier to open than known packages with gas barrier.

The Applicant however observed that, during the injection operations, the prelaminated hole was not always regularly pierced on the confetti portion side, but tended to break on the spout side. This caused portions of the material of the prelaminated hole to be entrapped into the plastic material forming the tearable membrane, so making this solution not completely satisfactory as to the effort required to the user to unseal the package and the pouring quality.

DISCLOSURE OF THE INVENTION

It is an object of the present invention to provide an apparatus and a method for injection molding opening devices on sheet packaging material for packaging pourable food products, which allow to eliminate the aforementioned drawbacks typically associated with known apparatus and methods.

According to the present invention, there are provided an injection molding apparatus as claimed in claim 1 and an injection molding method as claimed in claim 7.

BRIEF DESCRIPTION OF THE DRAWINGS

A preferred, non-limiting embodiment of the present invention will be described by way of example with reference to the accompanying drawings, in which:

FIG. 1 shows a partly sectioned, exploded side view of a sealed package made of sheet material and on which an opening device is injection molded using the apparatus and method according to the present invention;

FIG. 2 shows a section of the FIG. 1 sheet material before the opening device is applied.

BEST MODE FOR CARRYING OUT THE INVENTION

Figure 3:
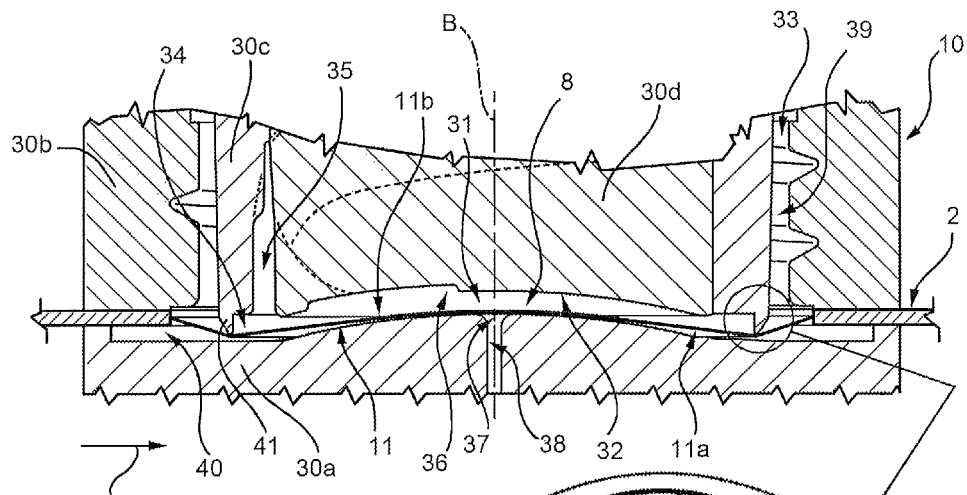
FIGS. 3 to 7 show sections of the FIG. 2 sheet material at successive steps in injection molding the opening device.
Figure 4:
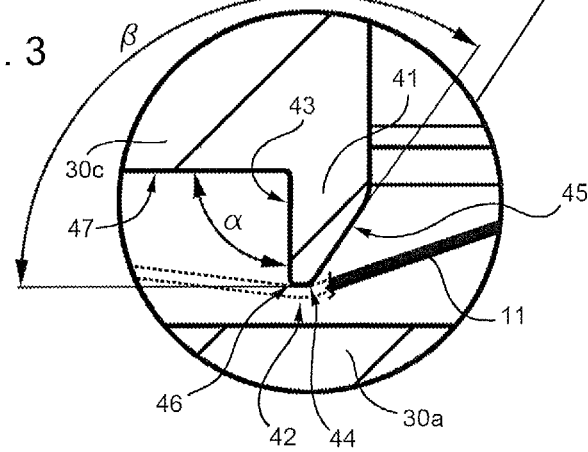
Figure 4:
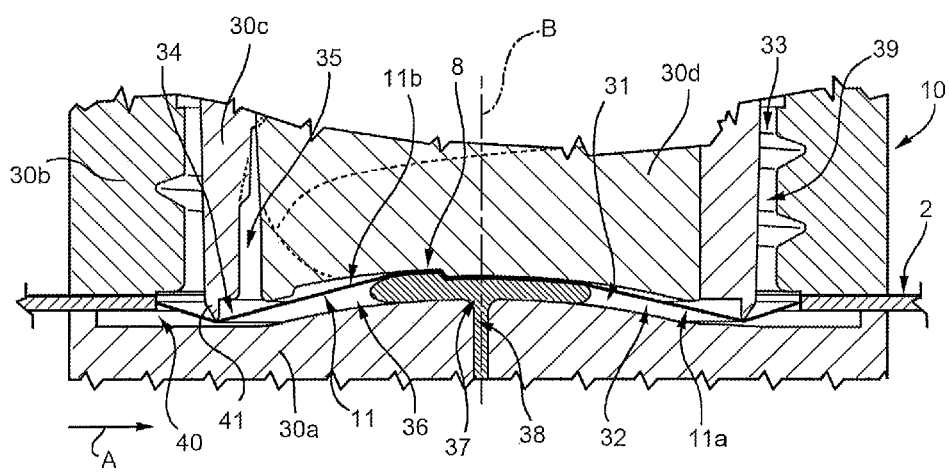
Figure 5:
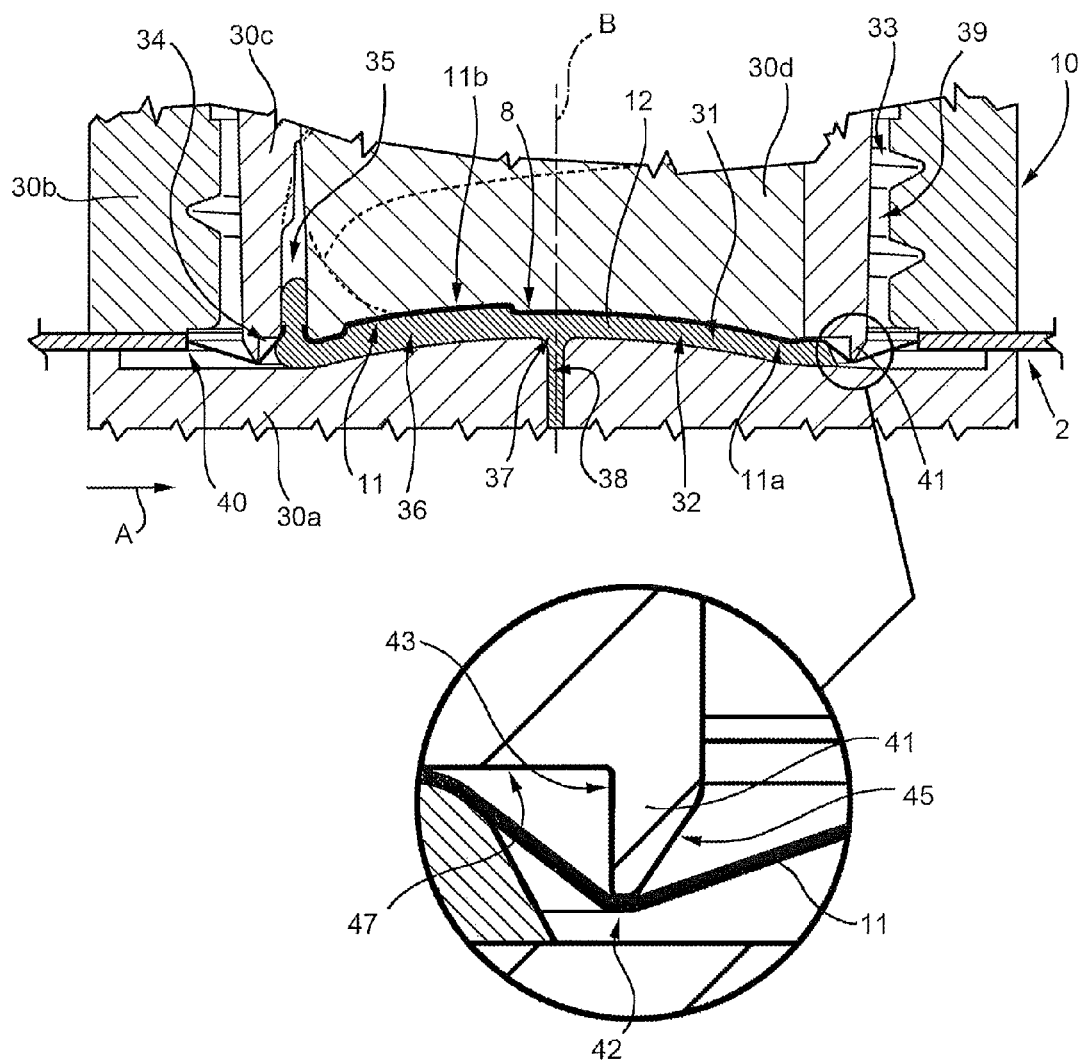

Number 1 in FIG. 1 indicates as a whole a sealed package for pourable food products, made of a multilayer sheet material 2 which is folded and sealed in known manner as described in detail above, and to which an opening device 3 of plastic material is applied using an injection molding apparatus 10 (shown in FIGS. 3 to 7) according to the present invention.

In the example shown, package 1 is parallelepiped-shaped and of the type known by the trade name Tetra Brik Aseptic (registered trademark). Apparatus 10 according to the present invention, however, also applies to advantage to other types of packages, such as the gable-top packages known by the trade name Tetra Rex (registered trademark).

With particular reference to FIG. 2, material 2 comprises a base layer 4 for stiffness and strength, which may be made of fibrous material, e.g. paper, or mineral-filled polypropylene material, and a plurality of layers 5 of heat-seal plastic material, e.g. polyethylene films, covering both sides of base layer 4.

In the case of an aseptic package 1 for long-storage products, such as UHT milk, packaging material 2 also comprises a layer 6 of gas-barrier material, e.g. aluminium foil or ethyl vinyl alcohol (EVOH) film, which is superimposed on a layer 5 of heat-seal plastic material, and is in turn covered with another layer 5 of heat-seal plastic material forming the inner face of package 1 eventually contacting the food product.

In other words, layers 5 and 6 define respective lamination layers applied to base layer 4 when producing material 2 in the form of a continuous strip.

Strip material 2 also comprises a number of removable portions 8 (only one shown in the drawings) equally spaced in a lengthwise direction A of the material, and to which opening devices 3 are subsequently injection molded.

In the following description, reference is made to one removable portion 8 and one opening device 3 for the sake of simplicity.

In the example shown, removable portion 8 is defined by a so-called prelaminated hole, i.e. a hole 9 formed through base layer 4 of material 2 and covered by lamination layers 5, 6, so that hole 9 is sealed by a respective sheet cover portion 11.

In an alternative embodiment not shown, cover portion 11 may even be defined by only one or some of layers 5, 6. For example, cover portion 11 may be made solely of gas-barrier material.

In another alternative embodiment not shown, cover portion 11 may be defined by a patch fixed to the rest of material 2 to seal a hole formed, in this case, through the full thickness of material 2.

As shown in particular in FIG. 1, opening device 3 has an axis B, which is substantially perpendicular to cover portion 11 and to the lengthwise direction A of strip material 2. Opening device 3 substantially comprises a confetti portion 12 adhering to one side 11a of cover portion 11—in the example shown, the side eventually facing inwards of package 1—, and a cylindrical tubular pouring spout 13, which is fixed to material 2 about hole 9, defines an opening 16 by which to pour the food product from package 1, and extends through cover portion 11 as a follow-on from the piercing thereof so as to be arranged on both sides 11a, 11b of the cover portion 11. Opening device 3 also comprises a cap 14 (FIG. 1) which fits removably to spout 13 to outwardly close opening 16.

More specifically, confetti portion 12 and spout 13 are injection molded in one piece, and cap 14 is formed separately from the whole comprising confetti portion 12 and spout 13.

Confetti portion 12 and cover portion 11 of hole 9 together define a sealing portion 15 sealing opening 16 of spout 13.

As shown particularly in FIG. 1, spout 13 comprises an annular flange portion 17, fixed to material 2 about hole 9, and a cylindrical tubular neck portion 18 projecting axially from an inner lateral edge of flange portion 17, and extending through a peripheral annular portion of cover portion 11. In other words, neck portion 18 projects from material 2 on side 11b opposite the side (11a) to which confetti portion 12 is fixed.

As shown in FIG. 1, confetti portion 12 and flange portion 17 are joined by an annular membrane connection portion 19, which is smaller in section than portions 12 and 17, so as to tear easily to detach sealing portion 15 from spout 13. In other words, annular membrane connection portion 19 defines a tear line along which to detach confetti portion 12 from spout 13.

On the side facing cap 14, confetti portion 12 has an integral projecting pull ring 21, by which to detach sealing portion 15 from spout 13 along annular membrane connection portion 19 and so free opening 16 to pour out the product.

More specifically, pull ring 21 extends inside, and at a predetermined distance from, neck portion 18, and is joined to confetti portion 12 by a tab 22.

As shown in FIG. 1, cap 14 is a screw type, and has a cylindrical lateral wall 23 with an inner thread 24, which engages a corresponding outer thread 25 on neck portion 18 of spout 13.

In order to injection mold opening device 3 on strip material 2, the latter is step-fed in direction A to position a removable portion 8 thereof inside molding unit 10 (FIGS. 3 to 7).

With reference to FIGS. 3 to 7, molding unit 10 comprises a number of molds 30a, 30b, 30c, 30d, which are coaxial with axis B of the opening device 3 being formed, are located on both sides of material 2, and are movable between an open configuration (not shown) allowing feed of material 2 in direction A, and a closed configuration (FIGS. 3 to 7), in which they define a closed mold cavity 31 housing cover portion 11 and adapted to be filled with molten plastic material to define, when the material sets, the whole comprising confetti portion 12 and spout 13.

In the example shown, molds 30b, 30c, 30d are located on the opposite side of material 2 to mold 30a; more specifically, molds 30b, 30c, 30d face side 11b of cover portion 11, whilst mold 30a faces side 11a of the same.

As shown in FIGS. 3 to 7, mold 30b is radially outer than mold 30d with respect to axis B, whilst mold 30c is interposed radially between molds 30b and 30d.

Mold cavity 31 basically comprises:
  a first confetti-shaped chamber 32 of axis B, which houses cover portion 11;
  a second tubular chamber 33 extending, coaxially with axis B, from one side of a flat annular peripheral portion 34 of chamber 32; and
  a third chamber 35 which defines pull ring 21 of confetti portion 12, and extends from the same side as chamber 33, and from a radially inner point of chamber 32 with respect to annular peripheral portion 34.

Chamber 32 comprises a convex central portion 36, curving towards chambers 33 and 35, connected to annular peripheral portion 34, and having, at axis B, an inlet 37 connected to a molten plastic injection conduit 38 extending through mold 30a.

Chamber 33 comprises a first cylindrical portion 39 projecting along axis B from a side, opposite to inlet 36, of chamber 32, and a substantially flat annular portion 40 extending radially outwards from annular peripheral portion 34 of chamber 32 and housing a peripheral edge of cover portion 11 and the portion of whole packaging material 2 extending around cover portion 11.

As shown in FIGS. 3 to 7, chamber 35 also projects along axis B from the same side of chamber 32 as cylindrical portion 39 of chamber 33.

In the FIG. 3-7 example, chamber 32 is defined by mold 30a on one side, and by molds 30c and 30d on the opposite side, chamber 33 is defined by molds 30a, 30c and 30b, and chamber 35 is defined by molds 30c and 30d.

As explained in detail below, chamber 32 defines confetti portion 12, whilst chamber 33 defines flange portion 17 and neck portion 18 of spout 12.

With particular reference to FIG. 3, mold 30c comprises an annular rib 41 extending around axis B and delimiting, with mold 30a, a narrow-section annular passage 42 connecting chamber 32 to chamber 33 and defining, when filled with the plastic material, the tearable annular membrane connection portion 19 between spout 13 and confetti portion 12.

As shown in the larger-scale detail of FIG. 3, annular rib 41 is bounded by a first annular surface 43 facing chamber 32, by a second annular surface 44, transversal to surface 43 and facing mold 30a, and by a third annular surface 45, opposite surface 43, facing chamber 33 and having a conical shape around axis B, tapering towards mold 30a. Moreover, in the zone of chamber 32 adjacent to surface 43, mold 30c is bounded by a surface 47, facing mold 30a and side 11b of cover portion 11 and forming a corner with the surface 43.

Surface 43 forms, with surface 44, a sharp edge 46 cooperating in use with cover portion 11 to stretch it and ease its piercing under the pressure of the molten plastic material in order to allow the latter to flow into chamber 33.

Advantageously, surfaces 43 and 47 form, in the corner zone, an angle $\alpha$, comprised between 80° and 110° so as to maximise the area along which cover portion 11 is pressed by the molten plastic material and to obtain that the cut cover portion is moved away from passage 42.

Figure 6:
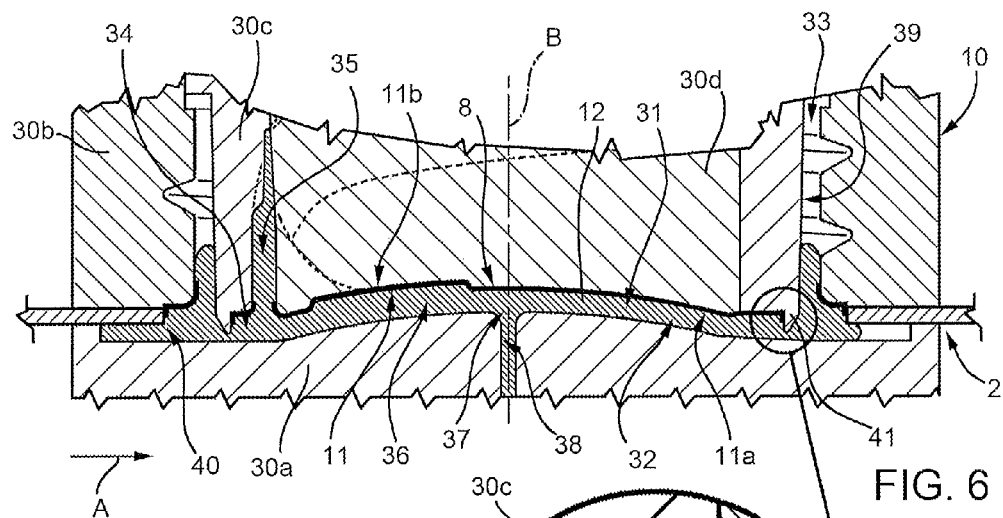

In particular, as clearly shown in FIG. 6, after the molten plastic material has fully filled chamber 32 and passage 42 so producing the piercing action on cover portion 11, the cut edge of the cover portion 11 is lastly arranged at a distance from edge 46 on the side of chamber 32.

The applicant has observed that the above result can be better achieved in the case in which angle $\alpha$ ranges between 80° and 100°.

According to a preferred embodiment of the present invention, surface 43 is substantially parallel to axis B, that is surface 43 may be strictly parallel to the axis B or may form a small angle of at most 5° with the parallel to said axis.

In the specific solution depicted in FIGS. 3 to 7, surface 43 is strictly parallel to axis B, in the sense that they do not meet at any point, even considering their prolongations.

In particular, surface 43 has a cylindrical configuration around axis B.

Furthermore, as disclosed in the FIG. 3, surfaces 43, 44 and 45 have the following geometric relationships:

surface 43 forms an angle, preferably of 90°, with surface 44; and surface 45 forms an angle $\beta$, preferably of 120°, with surface 44.

Besides, according to a preferred solution, surfaces 44 and 47 are substantially parallel to one another.

To mold opening device 3, material 2 is stopped inside molding unit 10 in the FIG. 3 configuration, in which cover portion 11 is housed completely, and totally undamaged, inside confetti-shaped chamber 32, narrow-section annular passage 41 and annular flat portion 40 of chamber 33 of mold cavity 31. More specifically, cover portion 11 is positioned with side 11b facing chamber 35 and cylindrical portion 39 of chamber 33 of mold cavity 31.

At this point, from side 11a of cover portion 11, molten plastic material is injected along conduit 38 into chamber 32, which is gradually filled from central portion 36 towards annular peripheral portion 34.

The pressure of the molten plastic material injected into chamber 32 of mold cavity 31 pushes cover portion 11 of material 2 against mold 30d, so that side 11b of cover portion 11 contacts mold 30d.

At this stage, layer 5 of heat-seal plastic material of cover portion 11, facing mold 30a, melts completely with the plastic material injected into mold cavity 31.

The molten plastic material spreads radially inside chamber 32 until it eventually reaches the intersection of chambers 32 and 35, where cover portion 11, having no solid support by molds 30c and 30d, is pierced neatly by the pressure of the molten plastic material, which therefore fills the whole of chamber 35 to form pull ring 21.

In exactly the same way, when the molten plastic material reaches the annular portion at the intersection of chambers 32 and 33, cover portion 11 is pierced by the pressure of the molten plastic material, which therefore flows into cylindrical portion 39 of chamber 33 to form neck portion 18 of spout 13 and thread 25.

In other words, the molten plastic material pierces through cover portion 11 at the intersections between chamber 32 and chambers 33 and 35 of mold cavity 31 to form through openings, which are subsequently sealed off by the plastic material to fully restore the integrity of material 2.

Before reaching chamber 33, the molten plastic material is forced to pass through narrow-section passage 42. During this stage, the molten plastic material advances towards the surface 43 delimiting the entry into passage 42 and forming sharp edge 46 with surface 44; cover portion 11 is therefore pushed by the pressure of the molten plastic material against the sharp edge 46, which produces a stretching action on the cover portion 11. This stretching action allows to obtain breaking of cover portion 11 near sharp edge 46.

Thanks to the particular geometry of mold 30c in the corner region between surfaces 43 and 47, which permits to maximise the contact area between the mold 30c and the cover portion 11, the cut edge of the latter is therefore moved away from passage 42 towards said corner region under the thrust of the molten plastic material; in this way, in its final position, the cut edge of cover portion 11 is arranged at a distance from edge 46 on the side of chamber 32.

Figure 7:
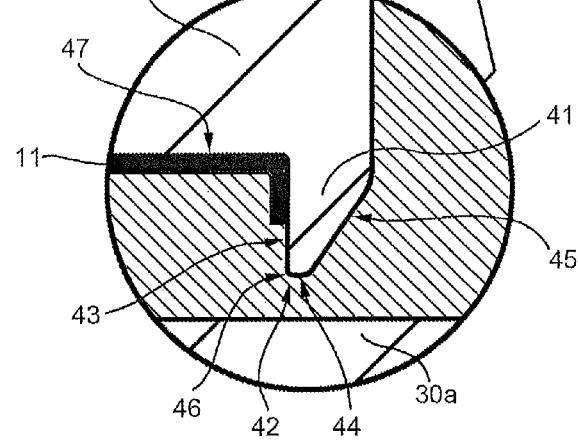
Figure 7:
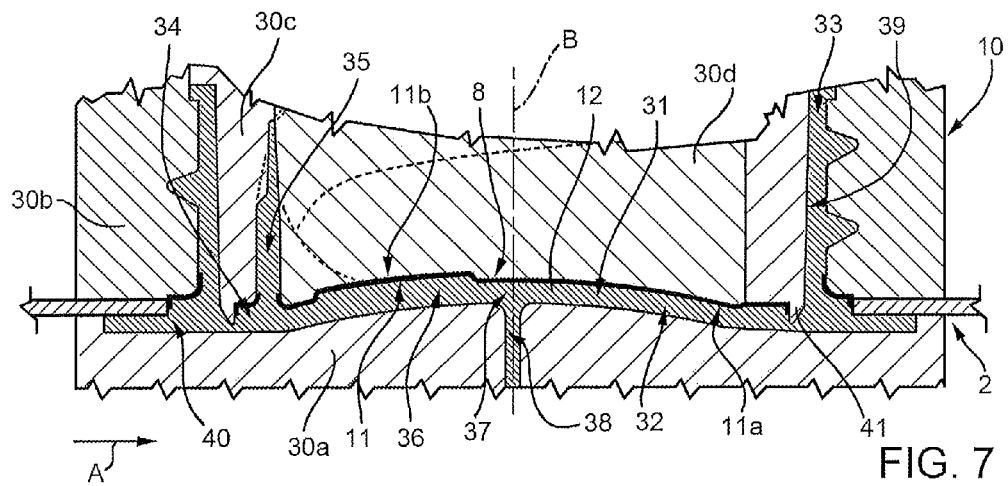

Moreover, as specifically shown in FIGS. 6 and 7, because of the particular angle between surfaces 43 and 47 and the high speed of the molten plastic material at the entry into passage 42, cover portion 11 is removed completely from annular membrane connection portion 19 and forms no connecting bridge with spout 13.

Once the plastic material filling the whole of mold cavity 31 sets, molds 30a, 30b, 30c, 30d are moved into the open configuration to feed material 2 once more in direction A, to extract the removable portion 8, with respective opening device 3 formed on it, from molding unit 10, and to insert another removable portion 8, on which to perform another molding operation, inside cavity 31.

The advantages of the injection molding apparatus and method according to the present invention will be clear from the foregoing description.

In particular, at the end of the injection molding operation carried out on the molding apparatus 10, it is possible to obtain an opening device 3 firmly connected to cover portion 11 of packaging material 2, but in which the cover portion is first pierced through and then resealed by the plastic material forming spout 13 and pull ring 21. As a result, package 1 has the necessary gas-sealing properties, while at the same time being as easy to open as packages with no gas barrier. That is, to unseal the package produced using molding apparatus 10, the user simply has to tear the annular membrane connection portion 19 connecting the plastic parts, as opposed to the gas-barrier material, which has already been pierced through when injection molding opening device 3.

As a matter of fact (please see in particular FIGS. 6 and 7), cover portion 11 is pierced neatly, with no fraying, on the side of confetti portion 12 by the combined action of the high pressure of the plastic material at the entry into passage 42 and the particular geometry of the angle α between surfaces 43 and 47, thus greatly improving opening of package 1 and smooth pour-out of the food product, which is not impaired by the possible presence of fragments of the material of the cover portion in the pouring hole 9.

Clearly, changes may be made to molding apparatus 10 and the molding method as described herein without, however, departing from the scope as defined in the accompanying Claims.

In particular, the molding operations described may be also applied on cover portions of any outer profile, i.e. even not circular, to produce opening devices having tubular pouring spouts with non-circular cross-sections, e.g. oval, elliptical or simply defined by closed-loop profiles.

Moreover, the molding operations described may also be performed directly on blanks of packaging material, after they are formed into open containers on spindles, and before they are filled with the pourable food product and sealed.

Last but not least, molds 30a, 30b, 30c, 30d may even be not coaxial to one another.

The invention claimed is:

1. An apparatus for injection molding an opening device on sheet packaging material for packaging pourable food products, the packaging material including at least a first and a second layer, and having a hole formed through the first layer and sealed by a cover portion of the second layer, the cover portion being transversal to an axis of the hole, and the apparatus comprising:
   first and second molds arranged on opposite sides of the packaging material and which can be set in an open configuration, allowing feed of the packaging material, and a closed configuration, wherein the first and second molds define a closed mold cavity housing the cover portion and adapted to be filled with molten plastic material for defining, when the plastic material sets, the opening device;
   the mold cavity including:
   a first chamber, which houses the cover portion and has an inlet for allowing the molten plastic material to be fed on, and cover, a first side of the cover portion;
   a second chamber projecting along the axis from a side of the first chamber and adapted to be filled with the molten plastic material coming from the first chamber by piercing the cover portion, in order to form, on a second side of the cover portion, a pouring spout of the opening device;
   wherein the first mold comprises a rib extending, in use, around the axis and delimiting, with the second mold, a narrow-section passage connecting the first chamber to the second chamber and defining, when filled with the plastic material, a tearable membrane connection portion between the spout and the plastic material covering the cover portion, the rib possessing a free end;
   the rib possessing a first surface facing the first chamber and forming an edge against which the cover portion is in use stretched by the pressure of the molten plastic material flowing into the passage, and the first mold possessing a second surface facing the first chamber and facing in use the cover portion;
   the rib also possessing a third surface facing the second chamber, the third surface tapering towards the first surface of the rib so that a width of the rib narrows toward the free end of the rib; and
   wherein the first and second surfaces form an angle between 80° and 110° so as to maximize the area along which the cover portion is pressed by the molten plastic material and to obtain that the cut cover portion is moved away from the passage.

2. An apparatus as claimed in claim 1, wherein said angle is comprised between 80° and 100°.

3. An apparatus as claimed in claim 1, wherein said first surface is substantially parallel to said axis.

4. An apparatus as claimed in claim 1, wherein said rib, said narrow-section passage, said tearable membrane connection portion and said first surface have annular configurations around said axis.

5. An apparatus as claimed in claim 1, wherein said first surface has a substantially cylindrical configuration around said axis.

6. AN apparatus as claimed in claim 1, wherein the third surface has a substantially conical shape around said axis and tapers towards said second mold.

7. The apparatus as claimed in claim 1, wherein the first surface is positioned to contact the molten plastic material in the first chamber when the molten plastic material is fed into the first chamber.

* * * * *